United States Patent
Khoreva et al.

(10) Patent No.: US 12,493,997 B2
(45) Date of Patent: Dec. 9, 2025

(54) GENERATING REALISTIC IMAGES FROM SPECIFIED SEMANTIC MAPS

(71) Applicant: Robert Bosch GmbH, Stuttgart (DE)

(72) Inventors: Anna Khoreva, Stuttgart (DE); Edgar Schoenfeld, Tuebingen (DE); Vadim Sushko, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 208 days.

(21) Appl. No.: 18/005,222

(22) PCT Filed: Aug. 20, 2021

(86) PCT No.: PCT/EP2021/073115
§ 371 (c)(1),
(2) Date: Jan. 12, 2023

(87) PCT Pub. No.: WO2022/043200
PCT Pub. Date: Mar. 3, 2022

(65) Prior Publication Data
US 2023/0267653 A1    Aug. 24, 2023

(30) Foreign Application Priority Data
Aug. 24, 2020   (DE) .................... 10 2020 210 712.2

(51) Int. Cl.
*G06T 11/00*     (2006.01)
*G06V 10/764*    (2022.01)
(Continued)

(52) U.S. Cl.
CPC ............ *G06T 11/00* (2013.01); *G06V 10/764* (2022.01); *G06V 10/771* (2022.01); *G06V 10/82* (2022.01)

(58) Field of Classification Search
CPC .............................. G06T 11/00; G06V 10/771
See application file for complete search history.

(56) References Cited

U.S. PATENT DOCUMENTS

| 2021/0158132 A1* | 5/2021 | Huynh ...................... G06N 3/04 |
| 2022/0269279 A1* | 8/2022 | Redford .................. G06N 20/00 |

FOREIGN PATENT DOCUMENTS

DE      102018204494 B3     8/2019

OTHER PUBLICATIONS

International Search Report for PCT/EP2021/073115, Issued Dec. 13, 2021.

(Continued)

*Primary Examiner* — Matthew Salvucci
(74) *Attorney, Agent, or Firm* — NORTON ROSE FULBRIGHT US LLP (57) ABSTRACT

A method for generating images from a semantic map, which assigns to each pixel of the images a semantic meaning of an object to which this pixel belongs. The semantic map is provided as a map tensor comprising channels which each indicates all the pixels of the images to be generated, to which the semantic map assigns a specific semantic meaning; a set of variable pixels of the images to be generated is provided, which are to vary from one image to the next; using values taken from a random distribution, a noise tensor with channels is generated, those values of the noise tensor which relate to the set of variable pixels being reused for each image to be generated; the channels of the map tensor are merged with the channels of the noise tensor to yield an input tensor, which is mapped by a trained generator onto an image.

13 Claims, 4 Drawing Sheets

(51) Int. Cl.
    *G06V 10/771*     (2022.01)
    *G06V 10/82*     (2022.01)

(56) References Cited

OTHER PUBLICATIONS

Yang et al., "On the Diversity of Conditional Image Synthesis With Semantic Layouts," IEEE Transactions on Image Processing, vol. 28, No. 6, 2019, pp. 2898-2907.
Uricar et al., "Yes, We Gan: Applying Adversarial Techniques for Autonomous Driving," Cornell University Library, 2020, pp. 1-16.
Liu et al., "Learning to Predict Layout-to-Image Conditional Convolutions for Semantic Image Synthesis," Cornell University Library, 2020, pp. 1-15.

* cited by examiner

GENERATING REALISTIC IMAGES FROM SPECIFIED SEMANTIC MAPS

FIELD

The present invention relates to generating realistic images with specified semantic meanings, which are usable for example for training image classifiers.

BACKGROUND INFORMATION

Around 90% of the information which a human driver needs to drive a vehicle in road traffic is visual information. For at least partly automated driving of vehicles, it is therefore essential to correctly evaluate the content of image data whichever modality is adopted for monitoring the vehicles' surroundings. Classification of the image data with regard to the objects contained therein that are relevant from a traffic standpoint, such as for example other road users, roadway markings, obstacles and traffic signs, is of particular significance to the driving task.

Corresponding image classifiers have to be trained with training images which have been captured in a wide range of traffic situations. Acquiring the training images is comparatively difficult and costly. Traffic situations which rarely arise in reality may be numerically underrepresented in the data set containing the training images to the extent that the image classifier is unable optimally to learn the correct classification thereof. Furthermore, a lot of manual work is required to "label" the training images, or their pixels, with associated nominal classifications ("ground truth").

Use is therefore also made of synthetically generated training data which are generated using a generator on the basis of Generative Adversarial Networks, GAN. Such a generator for radar data is described in German Patent No. DE 10 2018 204 494 B3.

SUMMARY

Within the context of the present invention, a method is provided for generating images.

The term "image" is not limited to static camera images, but rather for example also comprises video images, radar images, lidar images and ultrasound images.

The images to be generated may in particular for example be realistic with regard to a specified application. In this respect, "realistic" may in particular mean that the images can be used in a downstream application, such as for example when training an image classifier, in the same way as images captured with physical sensors. Realistically generated images may in particular be used for example to capture a stock of real training images, captured with sensors and then "labeled", for an image classifier. In the interest of improved clarity, the images to be generated are therefore designated hereinafter "realistic images" or "realistically generated images".

According to an example embodiment of the present invention, the realistic images are generated from a semantic map. This semantic map assigns to each pixel of the realistic images to be generated a semantic meaning of an object to which this pixel belongs. Consequently the realistic image generated is not random, but rather one which reflects the situation specified in the semantic map. The semantic map may accordingly for example designate a traffic situation with various roadways, roadway limitations, traffic signs, road users and further objects.

The semantic map is provided as a map tensor comprising a plurality of channels. Each channel indicates all the pixels of the realistic images to be generated, to which the semantic map assigns a specific semantic meaning. If the realistic image to be generated for example comprises a plurality of similar vehicles and a plurality of trees, the pixels which belong to vehicles are collected on a "vehicle" channel. Likewise, the pixels which belong to trees are collected on a "tree" channel.

According to an example embodiment of the present invention, at least one set of variable pixels of the realistic images to be generated is provided. "Variable" means in this connection that it is desired for precisely these pixels that they vary from one realistic image to the next. The method thus in particular pursues the objective of generating at the same time, from one and the same semantic map describing a scenery, a plurality of different images of this scenery.

In this respect, the specific application or problem at hand specifies which pixels are intended to be variable. It may thus for example make sense to generate, on the basis of a semantic map which characterizes a traffic situation, a plurality of realistic images which differ to the greatest possible extent from one another. To this end, for example, the set of variable pixels may comprise the complete image. It may, however, also be deliberately asked whether an image classifier, at a specific training level, also correctly assesses the traffic situation when given objects (for instance vehicles or trees) are exchanged for objects respectively of the same type but of different appearance. For such investigations, it is possible for example for just the pixels which belong to the vehicle or tree to be selected to be variable pixels.

Values taken from at least one random distribution are used to generate a noise tensor with multiple channels. Those values of the noise tensor which relate to the set of variable pixels are reused for each realistic image to be generated. Those values of the noise tensor which do not relate to the set of variable pixels remain constant for all the realistic images to be generated. The channels of the map tensor are merged with the channels of the noise tensor to yield an input tensor. This input tensor is mapped by a trained generator onto at least one realistic image.

It has been identified that in this way it is particularly simple to generate a plurality of realistic images which on the one hand have a predefined semantic meaning and on the other hand exhibit significant and simultaneously readily controllable variability. In this way, it is for example possible deliberately to tailor a set of training images for an image classifier in such a way that aspects with which the image classifier at this point still has difficulties are "practiced" particularly intensively. Furthermore, it is for example possible to counteract the tendency for the attention of the algorithm used for optimization to focus, during training of an image classifier using the training images, primarily on situations that arise very frequently, while at the same time too little attention is paid to very poor image classifier performance in situations that arise only rarely.

The training of an image classifier is namely frequently directed at mapping training images from a large pool on average as well as possible onto specified nominal semantic meanings. With such averaging, situations which occur frequently in the training images are automatically awarded greater weight. If the image classifier is for example to map traffic situations onto a correct semantic meaning, it is frequently trained with training images which were captured during test journeys made with a vehicle. These training images will, for example, relatively frequently include speed restrictions or intersections, because these situations occur frequently in real life. In contrast, situations where the road approaches an unsecured river bank or is blocked by a load shed by the vehicle in front are rarities. If this is not taken into account during training, the training may for example arrive at a situation in which every traffic situation arising at an intersection is mastered with great skill and, compared to the "reward" obtained therefor, the "punishment" for a miserable performance at the unsecured river bank is minimal. The image classifier may thus learn to leave gaps in its knowledge, like a school student who cannot stand mathematical problems relating to triangles and therefore decides from the outset to ignore the subject and gather the necessary marks in their school work by doing well at tasks not relating to triangles.

It is of no benefit to the user of a self-driving vehicle if the vehicle drives expertly at intersections but rolls down a river bank into the water or is forced to take evasive action due to the stated shed load and ends up hitting a tree. With the method according to the present invention described herein, the training data of the image classifier may, in contrast, be deliberately augmented in a wide range of aspects with a large number of situations involving river banks or lost loads. An image classifier which has fundamentally not mastered these situations cannot therefore obtain a good "mark" in the context of training optimization. The realistic images generated using this method may thus ultimately "force" the image classifier to abandon the path of least resistance and also learn in depth the "unloved" topics covering river banks and shed loads.

In many applications, it may be desirable for given image areas to vary as a unit, so that the image generated by the generator may be considered realistic in the context of the respective application. Thus, for example, one unitary object should be replaced as a whole by precisely one other object and not by a superposition or mixing of multiple objects. If, for example, the semantic map specifies that the image contains a pedestrian at a given point, then, on transition from one realistically generated image to the next, body parts of various people should not be mixed together but instead one whole person should be replaced by another.

Therefore, in one particularly advantageous configuration of the present invention, the values of the noise tensor are equated with at least one unit subset of the variable pixels which are to vary as a unit from one realistically generated image to the next. If these values are updated in order to generate the next realistic image, the whole unit subset is affected thereby in the same way.

In this configuration, therefore, formation of the noise tensor may for example involve filling a noise vector with the same number of components as the noise tensor has channels with new values from the random distribution and copying them to all the pixel positions belonging to the unit subset.

There may also be a plurality of unit subsets of pixels which are intended in each case to vary as a unit on transition from one realistically generated image to the next but in a different way. If, for example, there are two such unit subsets which relate to vehicles in the image, a private car in the first image may change into a taxi in the next image, while a police bus in the first image is replaced by a school bus in the second image. To this end, for each of the unit subsets in each case a new noise vector may for instance be taken from a random distribution and copied to all the pixel positions of the respective unit subset.

Particularly advantageously, according to an example embodiment of the present invention, at least one subset of pixels of the realistically generated images, to which the semantic map assigns a unitary semantic meaning, may be ascertained as the unit subset. In this way, it may for example be ensured that, on transition from one realistically generated image to the next, an object of a specific type is replaced with an object of the same size and same type but of a different appearance.

In order to pass from one realistically generated image to the next, i.e., to generate at least one further realistic image, in each case new samples may be taken from the at least one random distribution for the values of the noise tensor which relate to the set of variable pixels. A new input tensor may then be ascertained, in which these values have been updated with the new samples. For example, the noise tensor may be updated and then recombined with the map tensor, in order in this way to form a new input tensor. The values may, however, also for example be updated directly in the input tensor.

The number of channels in the noise tensor may in particular be used for example, when training the generator, to adjust a relative weighting of the following wishes:

on the one hand that the realistically generated images should have the semantic meaning according to the specified semantic map and on the other hand that given image areas should be appropriately varied on transition from one realistically generated image to the next.

In experiments carried out by the inventor, noise tensors with between 48 and 80 channels, preferably with 64 channels, haven proven to be a particularly advantageous compromise.

Any trainable module which is capable of mapping input tensors onto realistic images may in principle be used as the generator. Such a generator may in particular be "adversarially" trained at the same time as or alternately with a discriminator which is configured to distinguish the realistically generated images from real images. As training continues, the generator thus produces ever better "fakes", while at the same time the discriminator gets ever better at recognizing these "fakes".

In one particularly advantageous configuration of the present invention, a generator is selected which comprises a neural network with a sequence of multiple processing layers. These processing layers in each case generate spatially resolved feature maps. A feature map generated by a processing layer is then carried over as an input into the next processing layer, provided such a next layer remains present. At least one feature map is then conditioned on the input tensor.

This means that both the semantic map in the map tensor and the noise in the noise tensor no longer have an effect solely at the input of the generator but also in further processing steps. The influence of the semantic map and of the noise is thus not "lost" in the network like a one-off reminder, but rather is repeatedly recalled.

To condition the feature map on the input tensor, neuron activations or other processing units may for example in particular be modulated in the processing layer which generates the feature map, using the values of the input tensor. SPADE generators, which operate with spatially adaptive normalization, are for example especially suitable for this purpose.

The present invention also relates to a method for training a generator for use in the above-described method for generating realistic images.

For this method, real training images and associated semantic training maps, which assign a semantic meaning to each pixel of the respective training image, are provided. There is thus a semantic training map for each real training image. Conversely, there is at least one real training image for each semantic training map, since a semantically identical situation may for example have been captured with different exposures or different mapping parameters. The semantic training maps may for example be obtained by manual labeling of the real training images.

Realistic images are generated from at least one semantic training map using the above-described method. At least one real training image is ascertained for the same at least one semantic training map. To train the generator, a discriminator is used which is configured to distinguish realistic images generated by the generator from real images of the scenery specified by the semantic training map.

The realistic images generated by the generator and the at least one real training image are supplied to the discriminator.

Generator parameters which characterize the behavior of the generator are optimized with the goal that the realistic images generated by the generator are misclassified by the discriminator as real images.

At the same time, or indeed alternately therewith, discriminator parameters which characterize the behavior of the discriminator are optimized with the goal of improving accuracy when distinguishing between realistically generated images and real images. The discriminator is thus trained to classify a realistically generated image as a realistically generated image and a real training image as a real training image.

In this connection, the above-described method for generating realistic images has the advantage that, on the basis of one and the same available set of real training images and semantic training maps, the generator can be trained in relation to very different aspects of the realistic images to be generated.

As explained above, according to the above-described method, training images may in particular be generated for an image classifier which have a specified semantic meaning and at the same time a precisely defined variability. In particular, a training data set may be tailored to the image classifier for example to the effect that no situations "miss out". If comparatively few training images are available for a given situation, more suitable training images may simply be generated.

The present invention therefore also relates to a method for training an image classifier which assigns an input image, and/or pixels of this input image, to a semantic meaning.

With this method, realistic images are generated with a trained generator from semantic maps according to the above-described maps. These semantic maps are not restricted to those semantic maps which were used to train the generator but rather may describe any desired sceneries. Nonetheless, the generator may advantageously in particular be adversarially trained in coordination with a discriminator, as described above.

From the semantic maps, semantic nominal meanings are ascertained, onto which the trained image classifier is in each case to map the realistic images. The nominal meanings may in particular for example include an association with one or more classes of a specified classification. If, for example, a vehicle is shown in the semantic map at a given location, then the realistically generated image will contain a vehicle at this location. The image classifier should therefore at least assign this image area to the "vehicle" class.

A training data set for the image classifier, which contains real training images and associated nominal semantic meanings, is expanded by the realistically generated images and associated nominal semantic meanings. The image classifier is trained with the expanded training data set.

As explained above, the training data set may in this way be augmented in particular with realistic images of situations which were previously underrepresented in the training data set. In this way, the image classifier may be better enabled to handle these situations.

For example, training images of rare but dangerous traffic situations are often difficult to obtain. For example, fog, heavy snow or black ice, which are essential components of the situation, may only rarely occur. Other parts of the situation, such as for instance two vehicles on a collision course, may be too hazardous to be recreated with real vehicles.

The present invention therefore also relates to a further method. According to an example embodiment of the present invention, with this method, an image classifier, as described above, is trained with the additional use of realistically generated images. With this trained image classifier, images which have been captured with at least one sensor carried by a vehicle are assigned a semantic meaning. An actuation signal is ascertained from the semantic meaning ascertained by the image classifier. The vehicle is actuated using this actuation signal.

As a result of the improved training, the accuracy of the semantic meaning provided by the image classifier is advantageously improved. The probability that the vehicle response triggered by the actuation signal is appropriate to the traffic situation shown in the images is therefore advantageously increased.

The methods may in particular be wholly or partially computer-implemented. The present invention therefore also relates to a computer program with machine-readable instructions which, when executed on one or more computers, cause the computer or computers to carry out one of the described methods. For these purposes, control devices for vehicles and embedded systems for engineering devices which are likewise capable of executing machine-readable instructions are also to be considered computers.

The present invention likewise also relates to a machine-readable data storage medium and/or to a download product including the computer program. A download product is a digital product which is transferable via a data network, i.e., downloadable by a user of the data network, which can for example be offered for sale in an online store for immediate download.

A computer may furthermore be equipped with the computer program, with the machine-readable data storage medium or with the download product.

Further measures which improve the present invention are described in greater detail below with reference to figures, together with the description of preferred exemplary embodiments of the present invention.

DETAILED DESCRIPTION OF EXAMPLE EMBODIMENTS

Figure 1:
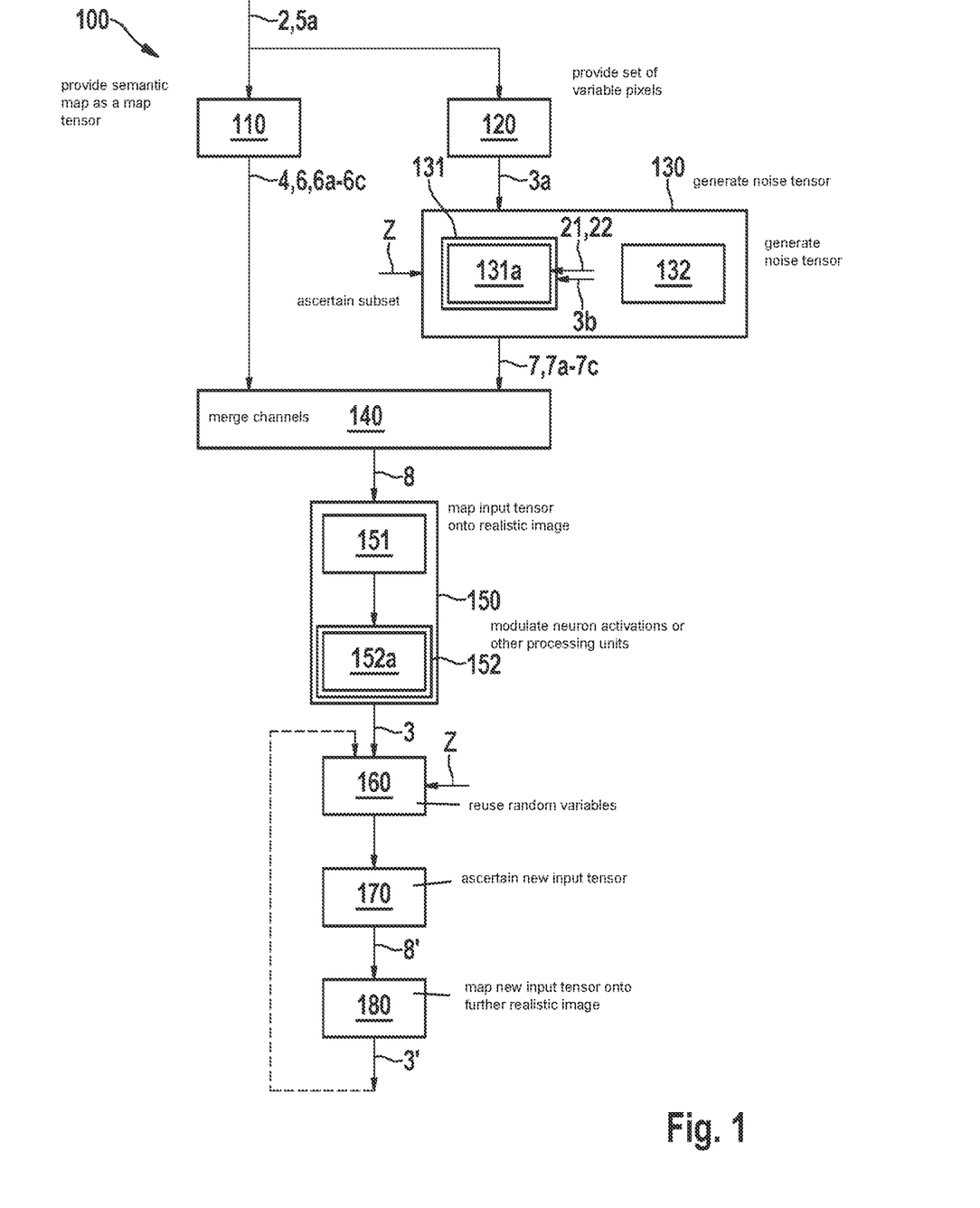
FIG. 1 shows an exemplary embodiment of the method 100 for generating realistic images 3, according to the present invention.

FIG. 1 is a schematic flow diagram of an exemplary embodiment of the method 100 for generating realistic images 3. A semantic map 2, 5a is used as the "raw material". This semantic map 2, 5a assigns to each pixel of the realistic images 3 to be generated a semantic meaning 4 of an object to which this pixel belongs.

In step 110, the semantic map 2, 5a is provided as a map tensor 6 comprising multiple channels 6a-6c. Each channel 6a-6c indicates all the pixels of the realistic images 3 to be generated, to which the semantic map 2, 5a assigns a specific semantic meaning 4. The channels 6a-6c are thus somewhat similar to the layers of a user-friendly drawing program, in which drawings with different semantic meanings 4 are processed separately from one another and then superimposed on one another.

In step 120, at least one set 3a of variable pixels of the realistic images 3 to be generated is provided. These are the pixels which are to vary on transition from one realistically generated image 3 to the next realistically generated image 3'.

Using values taken from at least one random distribution Z, in step 130 a noise tensor 7 with a plurality of channels 7a-7c is generated, those values of the noise tensor 7 which relate to the set 3a of variable pixels being reused for each realistic image 3 to be generated.

In this respect, according to block 131, the values of the noise tensor 7 may in particular for example be equated with pixels in a unit subset 3b which vary as a unit on transition from one realistically generated image 3 to the next realistically generated image 3'. In particular, according to block 131a, at least one subset 21, 22 of pixels of the realistically generated images 3 to which the semantic map 2, 5a assigns a unitary semantic meaning 4 may, for example, be ascertained as the unit subset 3.

The image area may thus for example be subdivided into various regions A, B, C and so on. In respect of region A, the noise tensor 7 then contains values which do not vary from one realistically generated image 3 to the next realistically generated image 3'. In the zone corresponding to region B, the noise tensor 7 is filled with a first noise vector identical for all the pixels. In the zone corresponding to region C, the noise tensor 7 is filled with a second noise vector identical for all the pixels, and so on.

According to block 132, for example a noise tensor 7 with between 48 and 80 channels may in particular be generated.

In step 140, the channels 6a-6c of the map tensor 6 are merged with the channels 7a-7c of the noise tensor 7 to yield an input tensor 8. This input tensor 8 thus has as many channels as the map tensor 6 and noise tensor 7 put together.

In step 150, this input tensor 8 is mapped by a trained generator 1 onto at least one realistic image 3. In this respect, according to block 151, a generator 1 may in particular be selected, for example, which comprises a neural network with a sequence of multiple processing layers. These processing layers in each case generate spatially resolved feature maps, which are then in turn carried over as input into the next processing layer, providing such a next layer remains. According to block 152, at least one feature map is then conditioned on the input tensor 8. This conditioning 152 may then in turn, according to block 152a, involve modulating neuron activations or other processing units in the processing layer which generates the feature map, using the values of the input tensor 8.

FIG. 1 shows, by way of example, how further realistic images 3' may then be produced. In step 160, those random values of the noise tensor 7 which relate to the set 3a of variable pixels may be reused as samples from the random distribution Z. In step 170, a new input tensor 8' may then be ascertained, which has been updated with the new samples. In step 180, the new input tensor 8' may then be mapped by the previously used trained generator 1 onto the at least one further realistic image 3'. As indicated by the dashed arrow, this process may be repeated as often as desired.

Figure 2:
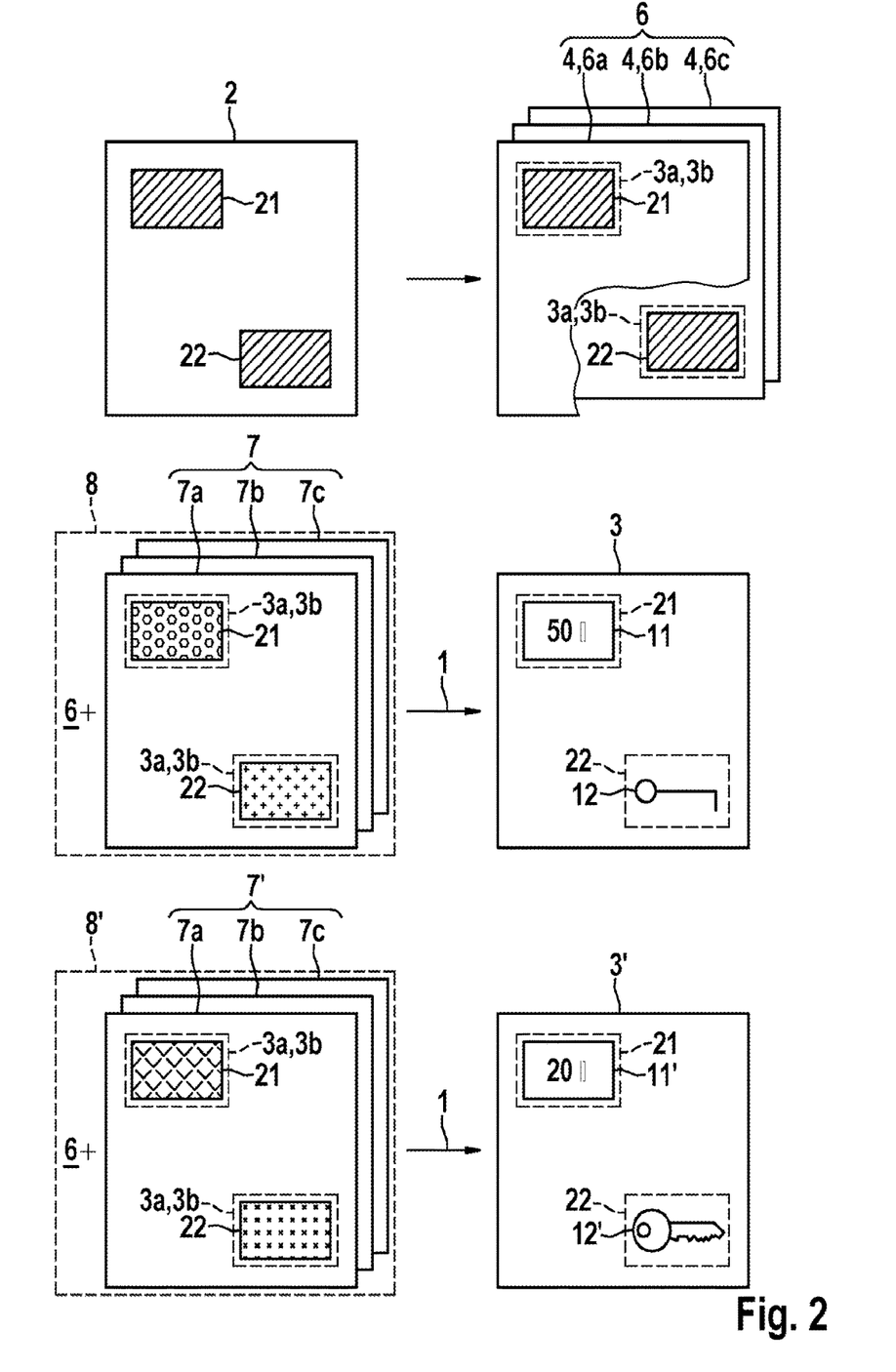
FIG. 2 illustrates the method 100 using a simple example, according to an example embodiment of the present invention.

The course of the method 100 is illustrated in FIG. 2 by way of a simple example. The starting point is a semantic map 2, which allocates the semantic meaning 4 "bank bill" to a first region 21 and the semantic meaning 4 "key" to a second region 22. This semantic map 2 is converted into the map tensor 6. The pixels of the first region 21 are labeled in the first channel 6a of the map tensor 6, which bears the meaning 4 "bank bill". In contrast, the pixels of the second region 22 are labeled in the second channel 6b of the map tensor 6, which bears the meaning 4 "key". In the example shown in FIG. 2, the set 3a of pixels varying from one realistically generated image 3 to the next 3' encompasses both the region 21 and the region 22. The regions 21 and 22 are additionally also unit subsets 3b, which are in each case intended to vary only as a unit.

In the noise tensor 7, all the pixels on all the channels 7a-7c are in each case assigned values taken from a random distribution Z. In this respect, an identical first random vector is used for all the pixels of the region 21, and an identical second random vector is used for all the pixels of the region 22. In this way, it is ensured that the generator 1 in each case generates precisely one object in the regions 21, 22, and not for instance a mixture of two or more objects. For clarity's sake, the noise present in the noise tensor 7 outside the regions 21 and 22 is not shown in FIG. 2.

The input tensor 8 arises from concatenating channels 6a-6c of the map tensor 6 and channels 7a-7c of the noise tensor 7. If this input tensor 8 is processed by the generator 1, the realistically generated image 3 is obtained, with a bank bill 11 in the region 21 and a key 12 in the region 22.

If two new random vectors are taken and in each case applied in the regions 21 and 22 in the noise tensor 7, a new noise tensor 7' arises. If this new noise tensor 7 is added to the map tensor 6, a new input tensor 8 is obtained. If this new input tensor 8' is processed with the generator 1, the new realistically generated image 3' is obtained. This new image 3' shows another bank bill 11' in the region 21 and another key 12' in the region 22. Here too, the noise present in the noise tensor 7' outside the regions 21 and 22 is omitted for the sake of clarity.

This is just a simple example. The semantic map 2 could contain still further regions, and here in particular those regions which do not vary on transition from one realistically generated image 3 to the next 3'.

Figure 3:
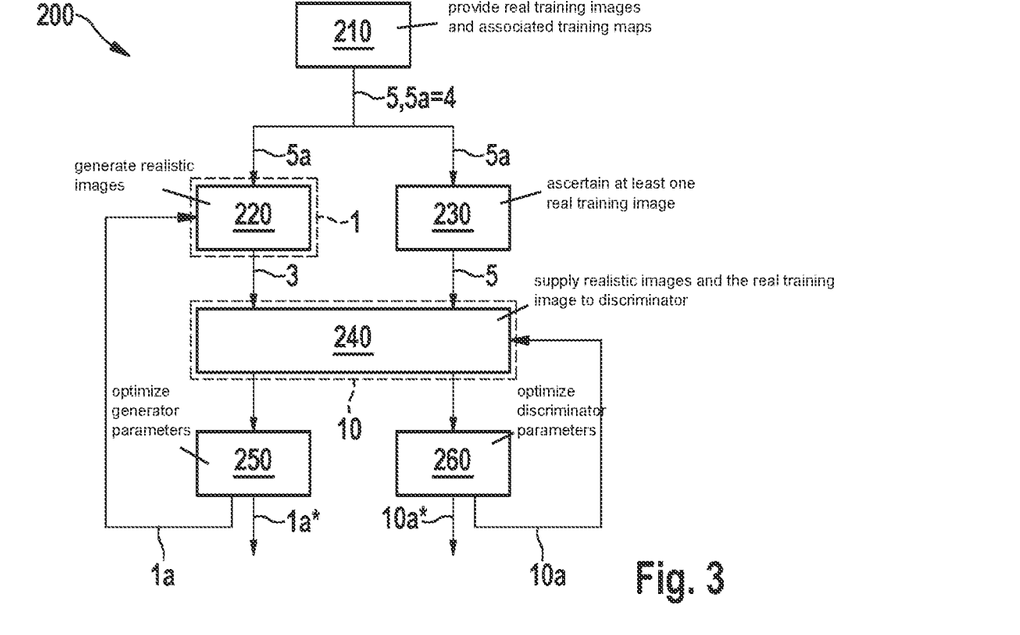
FIG. 3 shows an exemplary embodiment of the method 200 for training a generator 1, according to the present invention.

FIG. 3 is a schematic flow diagram of an exemplary embodiment of the method 200 for training a generator 1. In step 210, real training images 5 and associated semantic training maps 5a are provided. The semantic training maps 5a assign a semantic meaning 4 to each pixel of the respective training image 5.

In step 220, realistic images 3 are generated in accordance with the above-described method 100 from at least one semantic training map 5a using the generator 1 to be trained. In step 230, at least one real training image 5 is ascertained for the same at least one semantic training map 5a. This may for example be that training image 5 through the "labeling" of which the semantic training map 5a was obtained in the first place.

In step 240, the realistic images 3 generated by the generator 1 and the at least one real training image 5, which belong to the same semantic training map 5a, are supplied to a discriminator 10. This discriminator 10 is configured to distinguish realistic images 3 generated by the generator 1 from real images 5 of the scenery specified by the semantic training map 5a. The discriminator 10 is only required for training purposes. When the generator 1 is subsequently put to use after training thereof is complete, the discriminator 10 is no longer needed.

In step 250, generator parameters 1a, which characterize the behavior of the generator 1, are optimized with the goal that the realistic images 3 generated by the generator 1 are misclassified by the discriminator 10 as real images 5. At the same time, or indeed alternately therewith, in step 260, discriminator parameters 10a which characterize the behavior of the discriminator 10 are optimized with the goal of improving accuracy when distinguishing between realistically generated images 3 and real images 5.

The fully trained state of the generator parameters 1a is designated with reference sign 1a*. The fully trained state of the discriminator parameters 10a is designated with reference sign 10a*.

Figure 4:
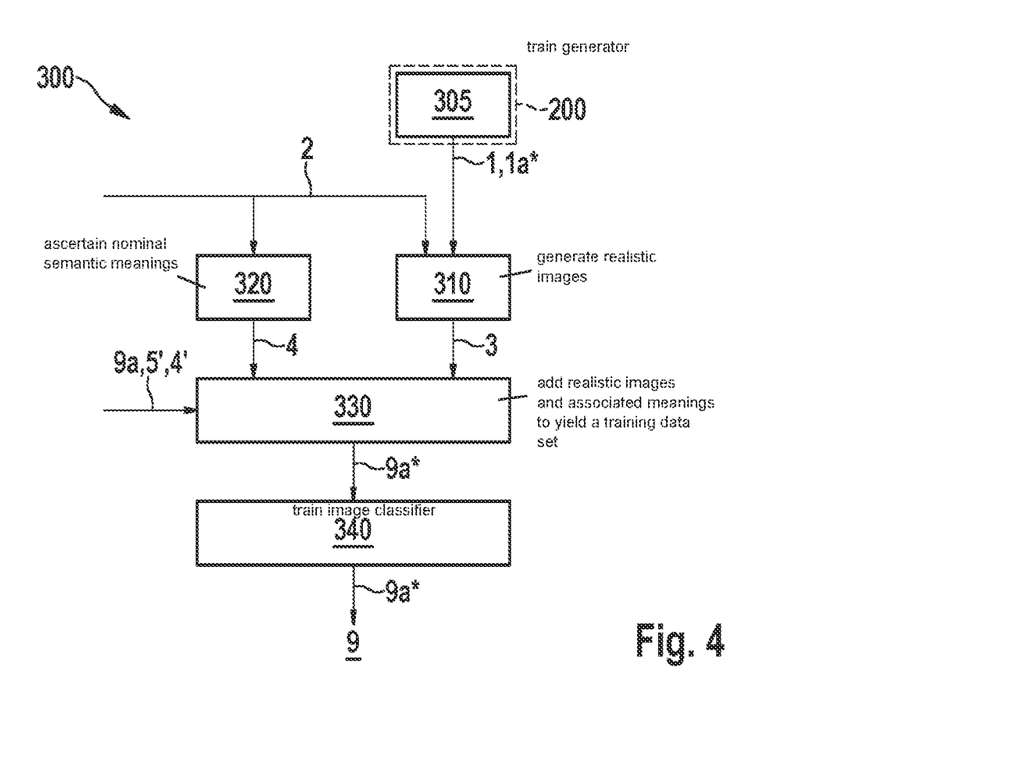
FIG. 4 shows an exemplary embodiment of the method 300 for training an image classifier 9, according to the present invention.

FIG. 4 shows a schematic flow diagram of an exemplary embodiment of the method 300 for training an image classifier 9. In step 305, a generator 1 is trained using the above-described method 200. In step 310, realistic images 3 are generated from semantic maps 2 using the trained generator 1. In step 320, nominal semantic meanings 4 are ascertained from the semantic maps 2 used in each case, onto which meanings the image classifier 9 is intended in each case to map the realistic images 3, or pixels thereof.

The realistic images 3 generated by the generator 1 as well as the associated nominal meanings 4 are added in step 330 to yield a training data set 9a, which already contains real training images 5' and associated nominal meanings 4'. The training data set 9a* expanded in this way is used in step 340 to train the image classifier 9.

Figure 5:
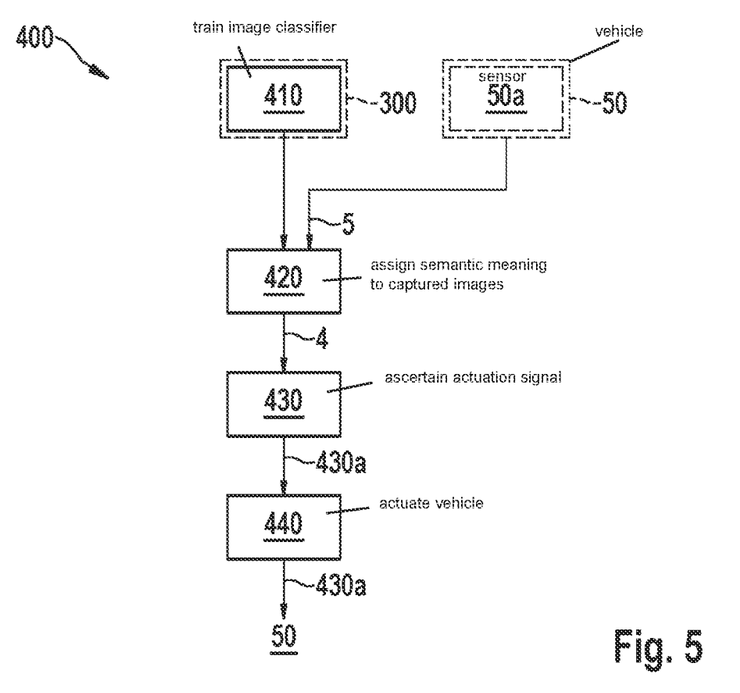
FIG. 5 shows an exemplary embodiment of the method 400 with a complete event chain for actuating a vehicle 50, according to the present invention.

FIG. 5 shows a schematic flow diagram of one exemplary embodiment of the method 300 with the complete event chain up to the point of actuation of the vehicle 50. In step 410, an image classifier 9 is trained using the above-described method 300. Using this image classifier 9, in step 420, images 5 which were captured with at least one sensor 50a carried by a vehicle 50 are assigned a semantic meaning 4. On the basis of this semantic meaning 4 ascertained by the image classifier 9, an actuation signal 430a is ascertained in step 430. In step 440, the vehicle 50 is actuated with this actuation signal 430a.

What is claimed is:

1. A method for generating images from a semantic map, which assigns to each pixel of the images a semantic meaning of an object to which this pixel belongs, the method comprising the following steps:
   providing the semantic map as a map tensor including a plurality of channels, each of the channels of the map tensor indicating all the pixels of the images to be generated, to which the semantic map assigns a specific semantic meaning;
   generating at least one set of variable pixels of the images to be generated, which are to vary from one image to the next image;
   generating, using values taken from at least one random distribution, a noise tensor with a plurality of channels, those values of the noise tensor which relate to the set of variable pixels being reused for each image to be generated;
   merging the channels of the map tensor with the channels of the noise tensor to yield an input tensor; and
   mapping the input tensor by a trained generator onto at least one image of the images to be generated, wherein in the noise tensor, one or more pixels on all the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided.

2. The method as recited in claim 1, wherein values of the noise tensor are equated with at least one unit subset of the variable pixels which are to vary as a unit from one generated image to the next.

3. The method as recited in claim 2, wherein at least one subset of pixels of the generated images, to which the semantic map assigns a unitary semantic meaning, is ascertained as the unit subset.

4. The method as recited in claim 1, wherein at least one further image is generated, by:
   taking new samples from the at least one random distribution for the values of the noise tensor which relate to the set of variable pixels;
   ascertaining a new input tensor, in which the values of the noise tensor are updated with the new samples;
   mapping the trained generator the new input tensor onto the at least one further image.

5. The method as recited in claim 1, wherein:
   the generator includes a neural network with a sequence of multiple processing layers, which each generate spatially resolved feature maps, which are then in turn carried over as input into a next processing layer, and
   at least one feature map is conditioned on the input tensor.

6. The method according to claim 5, wherein the at least one feature map is conditioned on the input tensor by modulating neuron activations or other processing units in the processing layer which generates the feature map, using the values of the input tensor.

7. A method for generating images from a semantic map, which assigns to each pixel of the images a semantic meaning of an object to which this pixel belongs, the method comprising the following steps:
   providing the semantic map as a map tensor including a plurality of channels, each of the channels of the map tensor indicating all the pixels of the images to be generated, to which the semantic map assigns a specific semantic meaning;
   generating at least one set of variable pixels of the images to be generated, which are to vary from one image to the next image;

generating, using values taken from at least one random distribution, a noise tensor with a plurality of channels, those values of the noise tensor which relate to the set of variable pixels being reused for each image to be generated;

merging the channels of the map tensor with the channels of the noise tensor to yield an input tensor; and mapping the input tensor by a trained generator onto at least one image of the images to be generated, wherein the noise tensor has between 48 and 80 channels.

8. A method for training a generator, comprising the following steps:

providing respective real training images, and associated semantic training maps, which assign a semantic meaning to each pixel of the respective training image;

generating images from at least one semantic training map by:

providing the semantic map as a map tensor including a plurality of channels, each of the channels of the map tensor indicating all the pixels of the images to be generated, to which the semantic map assigns a specific semantic meaning, generating at least one set of variable pixels of the images to be generated, which are to vary from one image to the next image, generating, using values taken from at least one random distribution, a noise tensor with a plurality of channels, those values of the noise tensor which relate to the set of variable pixels being reused for each image to be generated, merging the channels of the map tensor with the channels of the noise tensor to yield an input tensor, and mapping the input tensor by a trained generator onto at least one image of the images to be generated, wherein in the noise tensor, one or more pixels on all the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided;

ascertaining at least one real training image for the same at least one semantic training map;

supplying the images generated by the generator, and the at least one real training image, to a discriminator, which is configured to distinguish images generated by the generator from real images of scenery specified by the semantic training map;

optimizing generator parameters, which characterize a behavior of the generator, with a goal that the realistic images generated by the generator are misclassified by the discriminator as real images; and optimizing discriminator parameters, which characterize a behavior of the discriminator, with a goal of improving accuracy when distinguishing between generated images and real images.

9. A method for training an image classifier which assigns an input image, and/or pixels of the input image, to a semantic meaning, the method comprising the following steps:

generating images, using a trained generator, from semantic maps, by:

providing each semantic map as a map tensor including a plurality of channels, each of the channels of the map tensor indicating one or more of the pixels of the images to be generated, to which the semantic map assigns a specific semantic meaning, generating at least one set of variable pixels of the images to be generated, which are to vary from one image to the next image, generating, using values taken from at least one random distribution, a noise tensor with a plurality of channels, those values of the noise tensor which relate to the set of variable pixels being reused for each image to be generated, merging the channels of the map tensor with the channels of the noise tensor to yield an input tensor, and mapping the input tensor by a trained generator onto at least one image of the images to be generated, wherein in the noise tensor, one or more pixels on one or more the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided;

ascertaining nominal semantic meanings from each of the semantic, onto which meanings the trained image classifier is intended in each case to map the images;

expanding a training data set for the image classifier, which contains real training images and associated nominal semantic meanings, by the generated images and associated nominal semantic meanings; and training the image classifier with the expanded training data set.

10. The method as recited in claim 9, wherein the generator is trained by:

providing respective real training images, and associated semantic training maps, which assign a semantic meaning to each pixel of the respective training image;

generating images from at least one semantic training map by:

providing the semantic map as a map tensor including a plurality of channels, each of the channels of the map tensor indicating one or more of the pixels of the images to be generated, to which the semantic map assigns a specific semantic meaning, generating at least one set of variable pixels of the images to be generated, which are to vary from one image to the next image, generating, using values taken from at least one random distribution, a noise tensor with a plurality of channels, those values of the noise tensor which relate to the set of variable pixels being reused for each image to be generated, merging the channels of the map tensor with the channels of the noise tensor to yield an input tensor, and mapping the input tensor by a trained generator onto at least one image of the images to be generated, wherein in the noise tensor, one or more pixels on one or more of the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided;

ascertaining at least one real training image for the same at least one semantic training map;

supplying the images generated by the generator, and the at least one real training image, to a discriminator, which is configured to distinguish images generated by the generator from real images of scenery specified by the semantic training map;

optimizing generator parameters, which characterize a behavior of the generator, with a goal that the realistic images generated by the generator are misclassified by the discriminator as real images; and optimizing discriminator parameters, which characterize a behavior of the discriminator, with a goal of improving accuracy when distinguishing between generated images and real images.

11. A method, comprising:

training an image classifier by:
  generating images, using a trained generator, from semantic maps, by:
    providing each semantic map as a map tensor including a plurality of channels, each of the channels of the map tensor indicating one or more of the pixels of the images to be generated, to which the semantic map assigns a specific semantic meaning,
    generating at least one set of variable pixels of the images to be generated, which are to vary from one image to the next image,
    generating, using values taken from at least one random distribution, a noise tensor with a plurality of channels, those values of the noise tensor which relate to the set of variable pixels being reused for each image to be generated,
    merging the channels of the map tensor with the channels of the noise tensor to yield an input tensor, and
    mapping the input tensor by a trained generator onto at least one image of the images to be generated, wherein in the noise tensor, one or more pixels on one or more of the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided,
  ascertaining nominal semantic meanings from each of the semantic, onto which meanings the trained image classifier is intended in each case to map the images,
  expanding a training data set for the image classifier, which contains real training images and associated nominal semantic meanings, by the generated images and associated nominal semantic meanings, and
  training the image classifier with the expanded training data set;

assigning, using the image classifier, images which were captured with at least one sensor carried by a vehicle, a semantic meaning;

ascertaining an actuation signal from the semantic meaning ascertained by the image classifier;

actuating the vehicle using the actuation signal.

12. A non-transitory machine-readable data storage medium on which is stored a computer program for generating images from a semantic map, which assigns to each pixel of the images a semantic meaning of an object to which this pixel belongs, the computer program, when executed by one or more computers, causing the one or more computers to perform the following steps:

providing the semantic map as a map tensor including a plurality of channels, each of the channels of the map tensor indicating one or more of the pixels of the images to be generated, to which the semantic map assigns a specific semantic meaning;

generating at least one set of variable pixels of the images to be generated, which are to vary from one image to the next image;

generating, using values taken from at least one random distribution, a noise tensor with a plurality of channels, those values of the noise tensor which relate to the set of variable pixels being reused for each image to be generated;

merging the channels of the map tensor with the channels of the noise tensor to yield an input tensor; and mapping the input tensor by a trained generator onto at least one image of the images to be generated, wherein in the noise tensor, one or more pixels on one or more of the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided.

13. A computer configured to generate images from a semantic map, which assigns to each pixel of the images a semantic meaning of an object to which this pixel belongs, the computer configured to:

provide the semantic map as a map tensor including a plurality of channels, each of the channels of the map tensor indicating one or more of the pixels of the images to be generated, to which the semantic map assigns a specific semantic meaning;

generate at least one set of variable pixels of the images to be generated, which are to vary from one image to the next image;

generate, using values taken from at least one random distribution, a noise tensor with a plurality of channels, those values of the noise tensor which relate to the set of variable pixels being reused for each image to be generated;

merge the channels of the map tensor with the channels of the noise tensor to yield an input tensor; and map the input tensor by a trained generator onto at least one image of the images to be generated, wherein in the noise tensor, one or more pixels on one or more of the plurality of channels are in each case assigned values taken from the random distribution such that an identical first random vector is used for one or more pixels of a first region corresponding to the semantic map, and an identical second random vector is used for one or more pixels of a second region corresponding to the semantic map, in order to ensure that in each one of the first region and the second region in the at least one image of the images to be generated only one respective object is generated and a mixture of two or more objects is avoided.

* * * * *